United States Patent
Pestrue et al.

(10) Patent No.: US 7,021,423 B1
(45) Date of Patent: Apr. 4, 2006

(54) LADDER STAND WITH ADJUSTABLE IMPLEMENT REST AND PIVOTALLY MOVABLE FLIP-UP SEAT

(75) Inventors: Jeffrey Alan Pestrue, St. Louis, MI (US); Robert Butcher, Flushing, MI (US)

(73) Assignee: Eastman Holding Company, Flushing, MI (US)

( * ) Notice: Subject to any disclaimer, the term of this patent is extended or adjusted under 35 U.S.C. 154(b) by 0 days.

(21) Appl. No.: 10/603,754

(22) Filed: Jun. 25, 2003

Related U.S. Application Data

(60) Provisional application No. 60/392,068, filed on Jun. 27, 2002.

(51) Int. Cl.
*E06C 7/16* (2006.01)

(52) U.S. Cl. ...................... 182/116; 182/187

(58) Field of Classification Search ............. 182/116, 182/187, 188, 135, 136
See application file for complete search history.

(56) References Cited

U.S. PATENT DOCUMENTS

| | | | |
|---|---|---|---|
| 4,552,247 A * | 11/1985 | Purdy | 182/116 |
| 4,579,198 A * | 4/1986 | Lee | 182/115 |
| 4,782,918 A | 11/1988 | Brunner et al. | |
| 4,905,792 A | 3/1990 | Wilson | |
| 5,009,283 A | 4/1991 | Prejean | |
| 5,101,933 A * | 4/1992 | Huntley | 182/187 |
| 5,186,276 A * | 2/1993 | Craig | 182/187 |
| 5,279,390 A | 1/1994 | Phillips | |
| 5,368,127 A * | 11/1994 | Phillips | 182/187 |
| 5,465,933 A | 11/1995 | Todd | |
| 5,518,083 A | 5/1996 | Blennert | |
| 5,791,436 A * | 8/1998 | Talley, Sr. | 182/116 |
| 5,839,538 A | 11/1998 | Magyar | |
| 5,868,221 A * | 2/1999 | Brack, Jr. | 182/116 |
| 6,811,180 B1 * | 11/2004 | Molliere | 280/652 |
| 2002/0112919 A1 * | 8/2002 | Graham | 182/116 |
| 2003/0029674 A1 * | 2/2003 | Heath | 182/136 |

* cited by examiner

*Primary Examiner*—Alvin Chin-Shue
(74) *Attorney, Agent, or Firm*—Carrier, Blackman & Associates, P.C.; William D. Blackman; Joseph P. Carrier

(57) ABSTRACT

A portable ladder stand for outdoor use, which provides a hunter or naturalist with an elevated vantage point for viewing or harvesting game. The stand includes a pivotally attached seat to permit the hunter or naturalist to change from a seated position to a standing position or vice versa in a comfortable and secure manner. The stand further includes a plurality of adjustable rests, capable of being manipulated by the hunter or naturalist in either the seated or standing position, for convenient placement of various objects, such as a bow, pack, camera or gun.

20 Claims, 3 Drawing Sheets

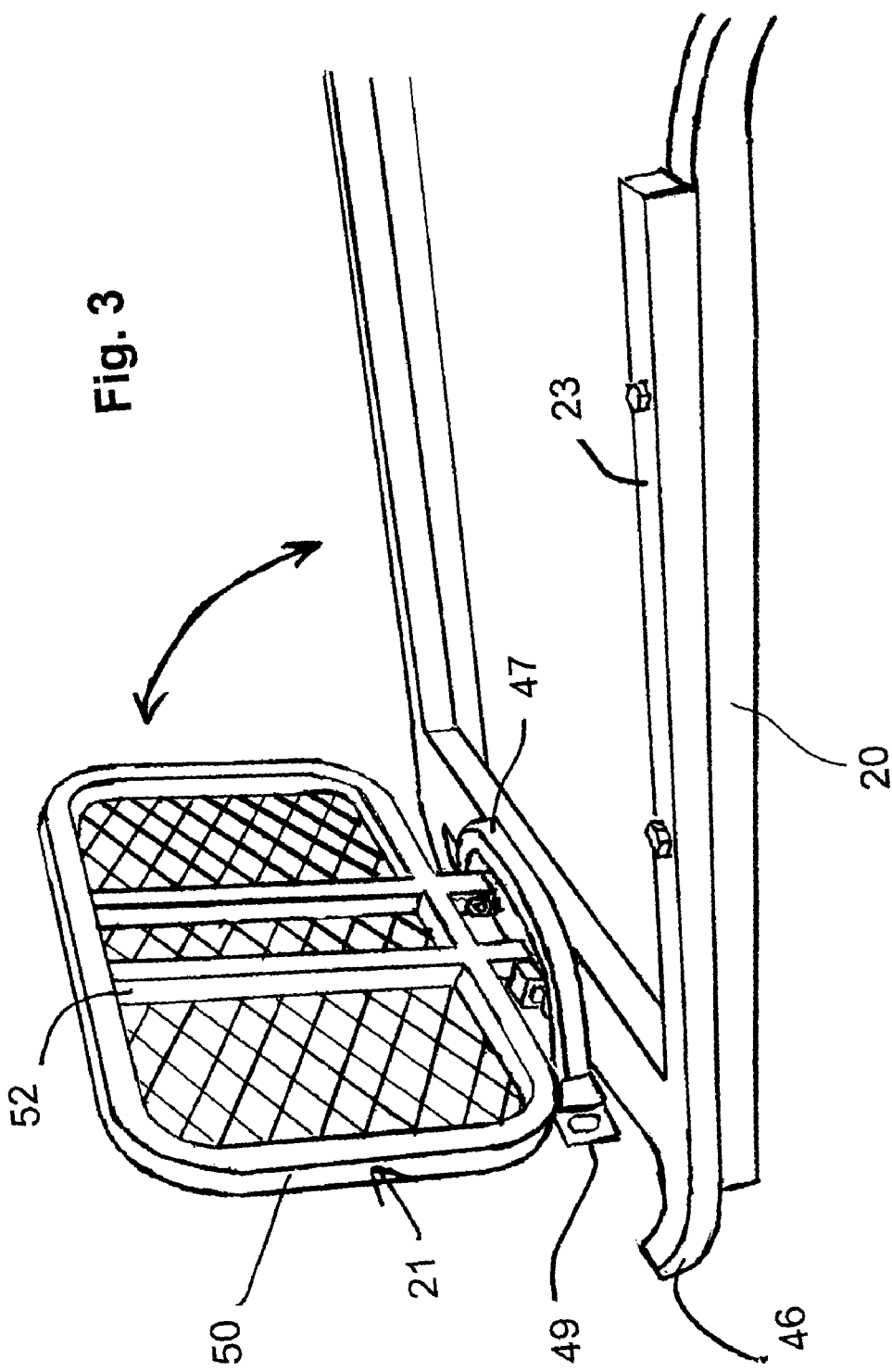

LADDER STAND WITH ADJUSTABLE IMPLEMENT REST AND PIVOTALLY MOVABLE FLIP-UP SEAT

FIELD OF THE INVENTION

The present invention relates to portable ladder stands, for use by outdoor enthusiasts in climbing to an elevated position. More particularly, the present invention relates to a portable ladder stand including a ladder and a pivotally movable seat portion. Optionally, the ladder stand may include at least one adjustable implement rest.

BACKGROUND OF THE INVENTION

There are many known climbing and elevated support devices for elevating the position of a hunter or naturalist in the field. The known support devices vary greatly in terms of their function and ability. For example, some of the known devices include:

(a) tree stands, which encompass two general varieties, climbing and non-climbing, both of which suspend the hunter or naturalist at a desired height, and secure solely to a tree;

(b) ladder stands, which elevate the hunter or naturalist to a maximum height relative to the length of the ladder, and which require the assistance of a tree for support and securement; and (c) tripods, which do not require the assistance of a tree for support, yet which elevate the hunter or naturalist relative to the ground.

While any device within the above three general categories will elevate the location of a hunter or naturalist on many types of terrain, each will perform better than the others given certain field conditions. By way of example, a hunter or naturalist would opt for a tree stand when the forest or vegetation canopy is high; thereby enabling the hunter or naturalist to position himself at or near the top of the canopy, for optimum concealment. Alternatively, when ground cover or brush is high, a hunter or naturalist may opt for a ladder stand to position himself slightly above the ground cover for maximum concealment and optimal visibility. As another option, a hunter of naturalist may choose a self-supporting tripod when the terrain does not include trees of suitable girth for securing a tree stand or ladder stand.

As a result, there exists a demand for each of the three general categories of elevated stands. Like all of the general categories, within the category of ladder stands there exist many variations on the general concept, which include an array of methods for attachment to the tree, seating and platform configurations, portability/collapsibility, etc.

Some known devices that depict ladder stands with various seating and platform configurations are illustrated in U.S. Pat. Nos., 4,782,918, 4,905,792, 5,009,283, 5,279,390, 5,368,127, 5,465,933, 5,518,083, 5,791,436, and 5,839,538.

Brunner et al., U.S. Pat. No. 4,782,918, entitled, "Portable Collapsible Tree Stand," discloses a foldably collapsible tree stand, which does not include a ladder. Part of the structure disclosed in the Brunner reference includes a seat which is pivotally attached to a seat mounting extension, for pivotal movement between extended and retracted positions thereof.

Prejean, U.S. Pat. No. 5,009,283, entitled, "Hunting Stand System," discloses a foldably collapsible hunting stand, which may include a ladder. The hunting stand of Prejean includes a movable seat which is pivotally mounted on a central post.

Blennert, U.S. Pat. No. 5,518,083, entitled, "Swing Arm Tree Stand," discloses a portable tree stand including a base for attaching to a tree, and a platform pivotally connected to the base by a swing arm. The base is held to a tree by chains or the like. A pair of lugs, secured to the base, pivotally support the swing arm therebetween. A seat is fastened to the distal end of the swing arm.

While the aforementioned inventions provide a variety of climbing devices to assist the hunter or naturalist who wishes to stand or sit in an elevated position, a need still exists in the art for a ladder stand which enables the hunter or naturalist to easily, comfortably, and quietly switch between standing and seated positions, and which also provides an adjustable implement rest for supporting an accessory, such as a gun barrel or camera lens.

SUMMARY OF THE INVENTION

The present invention has been developed to overcome many of the limitations and disadvantages of known ladder stands, and to generally fulfill a need in the art for an improved ladder stand. The ladder stand according to the present invention enables the hunter or naturalist to easily, comfortably and quietly change from a seated position to a standing position, or vice-versa, with minimal effort and movement. The ladder stand hereof alleviates problems associated with other known ladder stands, while also providing an adjustable implement rest for an accessory such as a gun, bow, telescope, or camera lens.

A ladder stand in accordance with a first embodiment of the present invention, generally includes a ladder for enabling travel from the ground to the platform, an upper frame assembly attachable to the top of the ladder, a standing platform for supporting a hunter or naturalist thereon, a movable seat which is pivotally connected to the upper frame assembly, and a plurality of securing members for attaching the ladder stand to a vertical support.

In a particular embodiment of the invention, the ladder stand hereof includes at least one implement rest, attached to the upper frame assembly, for supporting an implement thereon.

Accordingly, in a first embodiment thereof, the present invention provides a ladder stand including a ladder section, as a way for the hunter or naturalist to traverse from a ground position to an elevated position. When the ladder stand is set up in the field, the ladder section extends vertically upward from the earth at an angle less than 90° for a predetermined span. The ladder section may be made to disassemble into sections, or alternatively, it may be foldable and collapsible onto itself to provide a more compact and convenient mode for transportation.

The ladder stand according to the first embodiment also includes a standing platform, operatively attached to the ladder section, for extending outwardly therefrom toward a tree or pole to which the upper frame assembly is attached. The standing platform includes a substantially rectangular or U-shaped perimeter, with a plurality of cross members spanning across the interior portion of said perimeter. The upper surface of the standing platform may be covered with a vented or grate-like material, suitable for both improved grip and minimal water retention/collection.

Also in the first embodiment, the apparatus hereof further includes multiple securing straps for placement extending downwardly from the standing platform and wrapping around a vertical support such as a tree or pole, and for re-attaching to a predetermined area of the ladder section. These securing straps are equipped with a tightening mechanism.

The ladder stand according to the first embodiment also includes a seat assembly with a pivotally movable seat. The seat assembly includes a seat, first and second side rails, securing members for pivotally connecting the seat to said support members, a removable securing strap and a grooved angular plate for attachment to a vertical support.

Optionally, the apparatus may further include a plurality of downwardly extending cables interconnecting the standing platform and the side rails, in such a manner that the standing platform is not required to engage the tree or pole.

The ladder stand may also include at least one adjustment brace extending outwardly from a side rail of the upper frame assembly. The side rails may further contain additional adjustment braces and/or extension arms for an implement support, such as a gun rest or camera lens.

Other objects, advantages and salient features of the invention will become apparent from the following detailed description which, in conjunction with the annexed drawings, describes the presently contemplated embodiments of the invention.

BRIEF DESCRIPTION OF THE DRAWINGS

FIG. 3 is a detail perspective view of a seating platform and upper frame assembly, which is a component of the apparatus of FIGS. 1–2, showing the seating platform in a flipped-up position.

DETAILED DESCRIPTION

Figure 1:
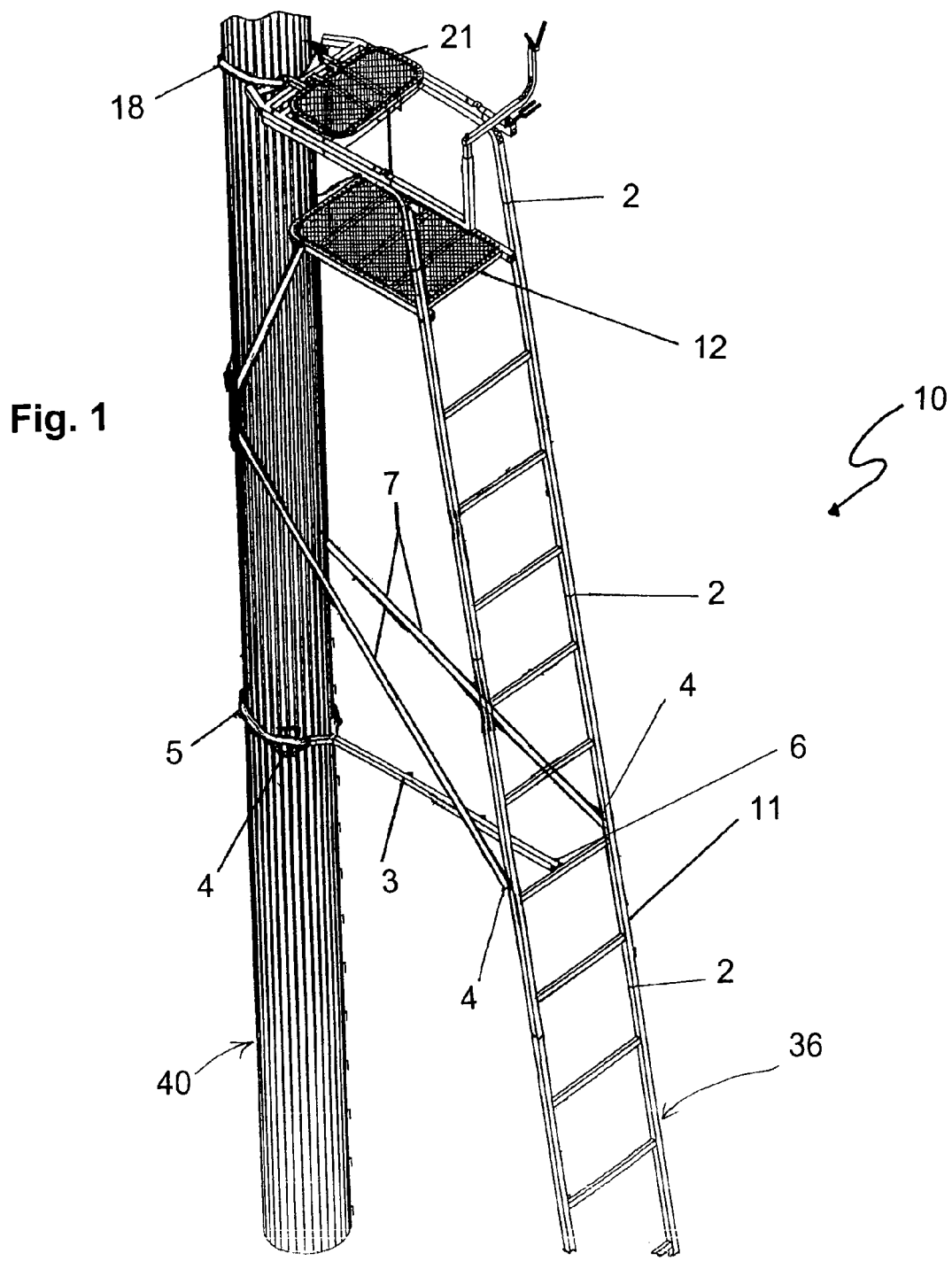
FIG. 1 is a perspective view of a ladder stand according to an illustrative embodiment of the invention.
Figure 2:
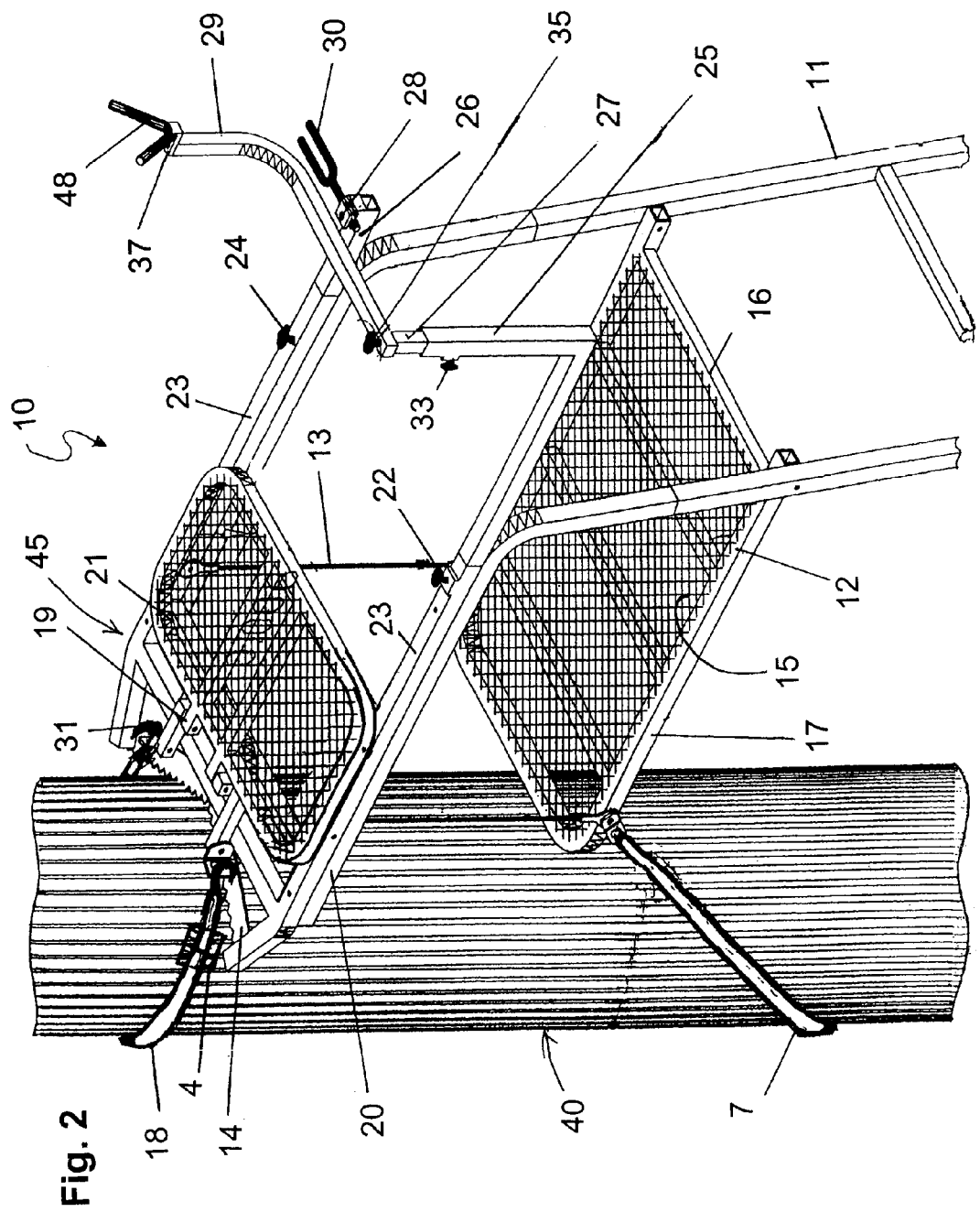
FIG. 2 is an enlarged perspective view of a top section of the ladder stand of FIG. 1, focusing on the standing platform, pivotally attached seat, and implement rests.

Referring to FIGS. 1 and 2, a ladder stand according to an illustrative embodiment of the present invention is shown generally at 10. The ladder stand 10 generally includes a ladder 11, a standing platform 12, and an upper frame assembly 45 supporting a pivotally movable seat 21.

The ladder stand 10 is provided to be used with a vertical support 40. It will be understood that the vertical support 40 does not form a part of the ladder stand 10 according to the present invention, but instead, the ladder stand is intended to be used in conjunction with a free standing vertical support, which will usually be a tree.

Throughout the present specification, relative positional terms like 'upper', 'lower', 'front', 'rear', 'top', 'bottom', 'horizontal', 'vertical', and the like are used to refer to the orientation of the apparatus as shown in the drawings. These terms are used in an illustrative sense to describe the depicted embodiments, and are not meant to be limitative. It will be understood that the depicted apparatus may be placed at an orientation different from that shown in the drawings, such as inverted 180 degrees or transverse to that shown, and in such a case, the above-identified relative positional terms will no longer be accurate. These relative positional terms are used herein to describe components the ladder stand in the installed configuration thereof, as shown in FIGS. 1 and 2.

Specifically referring to FIG. 1, the ladder 11, in the depicted embodiment, is a multi-rung ladder, extending to a predetermined height, and constructed of a strong, lightweight material such as aluminum, steel, metal alloy, or high-strength plastic. The ladder 11 may be formed from hollow tubing to minimize the weight thereof.

As shown in FIG. 1, the ladder 11 may be made up of several interlocking ladder segments 36 which fit nestingly together, and which are joined at the ends 2 thereof. The number of ladder segments 36 used may vary, depending on the application, thereby enabling the hunter or naturalist to either increase or decrease the height of the seating platform 21 and the standing platform 12, by adding or removing segments. The interconnecting ladder segments 36 also may be disassembled to provide for a more convenient mode of storing and/or transporting the apparatus 10.

Alternatively, the individual segments 36 may be pivotally hinged at the segment ends 2 thereof, enabling the ladder 11 to be collapsibly folded to facilitate storage and transportation of the apparatus 10.

Further referring to FIG. 1, the apparatus 10 incorporates a plurality of securing members 5, 7, and 18, for removably attaching the ladder stand 10 to a tree or pole.

As an optional feature, the apparatus 10 according to the present invention may include a substantially Y-shaped anchor arm 3, situated below the standing platform 12 at an intermediate portion of the ladder 11, for abutting placement against a vertical support 40 such as a tree or pole. Where used, the anchor arm 3 may be made removably attachable to the ladder 11 at a predetermined point 6.

Alternatively, the anchor arm 3 may be pivotally attached to the ladder 11 at the predetermined point 6, so as to be foldable thereon. The anchor arm 3, where used, is constructed of similar material to that of the ladder 11. The anchor arm 3 may include a substantially Y-shaped end opposite the end secured to the ladder 11, for removable attachment to a vertical support 40 by way of a first securing strap 5.

According to a preferred embodiment, the first securing strap 5 is constructed of a strong woven cloth material, and tightens to the tree or pole by way of a conventional ratcheting system 4.

Alternatively, the first securing strap 5 may be constructed of chain, braided wire, leather, or other flexible material capable of being securely fastened. Further as an alternative to the ratcheting system 4, another mechanism may be implemented such as one or more buckles or a draw-tight assembly.

Additionally in FIG. 1, the apparatus 10 includes relatively long stabilizing straps 7, which are constructed of material similar in kind to that of the first securing strap 5, and are tightened by way of a ratcheting system 4, or other tightening mechanism as discussed in connection with the first securing strap 5.

A first end of each of the stabilizing straps 7 may be attached to a free end of the standing platform 12, as shown. When the apparatus 10 is assembled and connected to a vertical support 40, as shown, the stabilizing straps 7 extend downward from either side of the standing platform 12, traverse around the vertical support 40, and reattach to the ladder 11 at a predetermined location. In the depicted embodiment, the stabilizing straps 7 may be reattached to the ladder 11 at an area substantially near the anchor arm 3. The stabilizing straps 7 reduce sway or twisting of the apparatus 10, thereby providing increased stability.

However, in an alternative embodiment of the apparatus 10, the stabilizing straps 7 may be removed or may solely secure around the vertical support 40 near the standing platform 12.

Referring to FIG. 2, the upper section of the apparatus 10 is shown in greater detail. The standing platform 12 may be pivotally attached to an upper ladder section, with one or more stop members such as the suspension cables 13 limiting downward movement of the free end thereof, relative to the upper frame assembly 45.

Alternatively, rather than being pivotally attached, the standing platform 12 may be rigidly affixed to the upper section of the ladder 11.

Extending outwardly from the ladder 11, the standing platform 12 includes a rectangular or substantially U-shaped perimeter 17, a plurality of cross members 16 and a grate-like top surface 15. The perimeter 17 and the cross members 16 are constructed from the same material as the ladder 10. The top surface 15 of the standing platform 12 may be composed of a metal grate or heavy-gauge screen which provides a number of advantages, namely drainage of rain and debris, non-skid surface for the user, and increased strength of the platform 12. Alternatively, another material such as vented aluminum, high-strength plastic or wood may provide similar advantages.

While the standing platform 12 is secured to the ladder 11 by rivets, bolts or other conventional fasteners, it is preferred that the standing platform 12 is adapted to be further secured to a vertical support 40 by way of the stabilizing straps 7 (as previously discussed with reference to FIG. 1), when the apparatus 10 is fully assembled and deployed in the field.

Additionally, the standing platform 12 may be further supported by suspension cables 13, which may interconnect the standing platform to an upper frame assembly 45 attached to the top of the ladder 11. Where used, the suspension cables 13 secure the free end of the standing platform 12 to the reinforcing rails 20 of the upper frame assembly 45.

The suspension cables 13 may be made of a plastic-coated braided wire. Alternatively, the suspension cables 13 may be constructed from a single strand of flexible elongate material of sufficient gauge to ensure safe operation. In accordance with the preferred embodiment, the standing platform 12 may be truncated so that the free end thereof does not directly engage the vertical support 40, save the contact between the additional support straps 7 and the vertical support.

Alternatively, dual contact may be established with the vertical support 40 from both the seat section and the standing platform 12, if desired.

As an alternative to the use of the cables 13, equivalent structure could be provided by solid tubular members (not shown) substituted in place of the cables.

Further referring to FIG. 2, in the installed position thereof, the ladder 11 leans inwardly toward the vertical support 40, and connects with an upper frame assembly 45 at the uppermost portion of the apparatus 10. The upper frame assembly 45 is disposed substantially parallel to the ground. In the embodiment of FIGS. 1–3, the upper frame assembly includes a pair of spaced apart L-shaped reinforcing rails 20, which nestingly engage the ladder ends.

The upper frame assembly 45 also includes an adjustment brace 23 secured to the reinforcing rails 20, as shown. The adjustment brace 23 is substantially U-shaped and having a pair of parallel legs interconnected be a web at a closed end thereof, similar in scale to that of the reinforcing rails 20 and constructed of similar material.

Also in the embodiment of FIGS. 1–3, a pair of spaced apart, integrally formed support studs 46 (FIG. 3) are provided extending outwardly at the corners of the adjustment brace 23, to support the ends of an angular blade 14.

The saw-toothed, angular blade 14 and a securing strap 18 with ratcheting system 4 and hooks 31 are located along the rearmost section of the adjustment brace 23. The angular blade 14 and securing strap 18 are provided to removably attach the upper frame section 45 of the apparatus 10 to a vertical support 40 such as a tree or pole. The angular blade 14 is attached to the support studs 46 using strong fasteners, such as nuts and bolts. The securing strap 18 and ratcheting system 4 are of similar construction and function to those previously discussed, and incorporate similar alternative embodiments.

The saw-toothed, angular blade 14 is constructed of rigid material such as aluminum, steel alloy metal, or other material suitable for engaging the exterior surface of a tree or wooden pole, while the hooks 31 are constructed of similar material, but may, as an alternative embodiment, be replaced by a durable clip or carabiner (not shown) of material suitable to handle the stress incurred as a result of tightening the securing strap 18 and supporting the weight of the hunter or naturalist.

Referring now to FIG. 3, it will be seen that a substantially C-shaped limit bar 47 is fixedly attached to the adjustment brace 23, to limit downward movement of the seat platform 21. Most preferably, the limit bar 47 is welded or otherwise fixedly attached to the adjustment brace 23. The ends of the limit bar 47 may take the form of outwardly extending anchor plates 49, having openings formed therein to receive hooks 31 of the securing strap 18.

The seat 21 is securely pivotally attached to the adjustment brace 23, and is pivotally movable relative thereto, so as to enable the hunter or naturalist to sit on the seat 21 or, alternatively, to lift the seat 21 up and stand on the standing platform 12, leaning comfortably against the vertical support 40.

The seat 21 is constructed of material similar to that of the standing platform 12 (although smaller in scale) in that the seat 21 includes an outer perimeter 50, a plurality of cross members 52, and a grate-like upper panel. The seat 21 is preferred to also include a pair of connector bars 19, extending outwardly from the perimeter 50, for facilitating pivotal attachment of the seat to the adjustment brace 23. The connector bars 19 may also extend across the central portion of the seat 21, as shown, for added strength and reinforcement. The connector bars 19 allow the seat 21 to be pivotally attached to the upper frame 45 at two spaced apart connections, for superior strength as compared to a single attachment point.

Additionally, in accordance with an alternative embodiment, the seat 21 may optionally include a fabric or cushioned top surface (not shown).

As further illustrated in FIG. 2, the apparatus 10, in accordance with the preferred embodiment, includes one or more adjustable extension arms. Examples of suitable extension arms are shown at 25 and 26, which fit telescopically inside of and extend outwardly from spaced-apart side segments of the adjustment brace 23. The extension arms 25 and 26 are constructed of material similar to that of the adjustment brace 23, although slightly smaller in cross-section. As noted, the end portions of the extension arms 25 and 26 slide telescopically in and out of the open ends of the adjustment brace, providing for a plurality of extendable positions. The extension arms 25 and 26 are adjustably secured to the adjustment brace 23 by way of tension knobs 22 and 24. The tension knobs 22, 24 include threaded shafts extending downwardly, which fit into corresponding threaded bosses on the brace 23. The tension knobs 22, 24 are able to be manipulated by the hunter or naturalist in either the seated or standing position.

While the preferred embodiment of the apparatus 10, depicts the general shape of the adjustment brace 23 and the extension arms 25 and 26 to be substantially box-like, for which tension knobs 22 and 24 are suitable for adjustment; an alternative embodiment of the apparatus 10 may include a substantially cylindrical tube-like configuration for said brace 23 and arms 25 & 26, whereby alternative structures other than tension knobs 22 & 24 may be used, such as tension clamps or pressure twist grips.

Located on the upper portion of the extension arm 26 is an adjustable first implement rest 30, which may be used to support a hunting bow or pack. Although the first implement rest 30 is fixably attached to the extension arm 26, the mounting bracket 28 permits the rest 30 to rotate, thereby enabling a hunter to rest a bow at any desired angle. While, according to the preferred embodiment, the first implement rest 30 is substantially wishbone-shaped and constructed of plastic-coated metal, alternative embodiments may include a cradle-shaped rest (not shown). The first implement rest 30 may alternatively be constructed from a strong plastic or polymer.

The other extension arm 25 is substantially L-shaped and includes additional components such as tension knobs 33 and 35, a height-adjustable elongate member 27, a swivel arm 29, rotatable mounting bracket 37 and a second implement rest 48. The height-adjustable elongate member 27 engages the extension arm 25 similar to that of the engagement between the extension arm 25 and the adjustment brace 23, and incorporates similar construction as well as similar alternative embodiments.

As illustrated in FIG. 2, in the depicted embodiment, the extension arm 25 is substantially L-shaped; however, as an alternative embodiment, the extension arm 25 may be constructed of another varying shape such as a substantially J or S-shaped member, or may be angled upwardly from the adjustment brace 23.

The swivel arm 29 is rotatably attached to the height-adjustable elongate member 27 by a tension knob 35, which permits fore and aft rotation relative to the hunter or naturalist. The swivel arm 29 is constructed of material in kind to that of the aforementioned ladder 11 and adjustment brace 23. The swivel arm 29 is substantially L-shaped and engages a mounting bracket 37 which rotatably secures a second implement rest 48, for supporting part of a gun or camera lens thereon. The mounting bracket 37 is similar to that of the mounting bracket 28 secured to the extension arm 26.

The second implement rest 48 is preferably constructed of metal, a strong plastic, or plastic-coated metal. The rest 48 is substantially V-shaped, and is rotatably mounted to the swivel arm 29, to permit the hunter or naturalist to rotatably adjust the rest 48, through a full range of 360 degrees.

Although the present invention has been described herein with respect to a specific embodiment thereof, the foregoing description is intended to be illustrative, and not restrictive. Those skilled in the art will realize that many modifications of the preferred embodiment could be made which would be operable. All such modifications, which are within the scope of the appended claims, are intended to be within the scope and spirit of the present invention.

We claim:

1. A ladder stand for use in elevating a hunter or naturalist, said ladder stand comprising:
    a ladder for enabling travel from the ground to a platform,
    an upper frame assembly comprising a substantially U-shaped brace having a pair of parallel legs interconnected by a connecting member, wherein said brace is operatively attached to an upper end of the ladder and is configured to be oriented substantially horizontally in an installed configuration of the ladder stand, the brace including an open end and a closed end at the connecting member for placement proximate a vertical support,
    a standing platform for supporting a hunter or naturalist thereon, the standing platform being operatively attached to the ladder below the upper frame assembly;
    a movable seat which is pivotally connected to the connecting member at the closed end of the U-shaped brace in a manner such that the seat is upwardly pivotally movable out of contact with the pair of parallel legs in the installed configuration of the ladder stand,
    a plurality of securing members for removably attaching the ladder stand to a vertical support; and
    a support contacting member which is rigidly affixed to the closed end of the brace above the standing platform for contacting said vertical support,
    wherein a primary area of the ladder stand provided for contacting said vertical support, in an installed configuration thereof, is provided by the support-contacting member above the standing platform.

2. The ladder stand of claim 1, further comprising at least one implement rest which is adjustably connected to a portion of the upper frame assembly above the standing platform, for supporting an implement thereon.

3. The ladder stand of claim 1, wherein the seat is pivotally attached to the connecting member of the upper frame assembly at two spaced apart connections.

4. The ladder stand of claim 1, further comprising a limit bar which is fixedly attached to the brace of the upper frame assembly, to limit downward movement of the seat.

5. The ladder stand of claim 1, wherein the standing platform includes a first end which is operatively attached to the ladder, and a second end which is operatively interconnected to the upper frame assembly.

6. The ladder stand of claim 5, wherein the standing platform is substantially parallel to the brace in the installed configuration thereof, and wherein the second end of the standing platform is suspended from the upper frame assembly by a plurality of support members extending therebetween.

7. The ladder stand of claim 2, further comprising at least one extension arm adjustably connected to said brace above the standing platform, for adjusting a position of said implement rest.

8. The ladder stand of claim 7, further comprising a pivotally movable swing arm attached to said extension arm, said swing arm situated above the brace in the installed configuration of the ladder stand.

9. The ladder stand of claim 1, wherein the seat includes side portion which rest on and contact the pair of parallel legs of the brace at a plurality of contact points along respective parallel portions thereof when the seat is in the operative position thereof.

10. The ladder stand of claim 2, wherein said implement rest includes a substantially wishbone-shaped support member.

11. The ladder stand of claim 2, wherein said upper frame assembly includes a pivotally adjustable swing arm, said swing arm situated above the brace in the installed configuration of the ladder stand, and wherein said implement rest is attached to said swing arm.

12. A ladder stand for use in elevating a hunter or naturalist, said ladder stand comprising:
    a ladder for enabling travel from the ground to a platform, an upper frame assembly comprising two spaced-apart reinforcing rails attachable to the top of the ladder, and a substantially U-shaped brace having a pair of parallel legs interconnected by a connecting member, wherein said brace rests on and is fixedly attached to the reinforcing rails;

a standing platform for supporting a hunter or naturalist thereon, said standing platform operatively attached to an upper end of the ladder;

a movable seat which is pivotally connected to the connecting member in a manner such that the seat is upwardly pivotally movable out of contact with the pair of parallel legs in an installed configuration of the ladder stand, a plurality of securing members for removably attaching the ladder stand to a vertical support, and at least one implement rest which is adjustably attached to the upper frame assembly, for supporting an implement thereon.

13. The ladder stand of claim 12, wherein the seat is pivotally attached to the connecting member of the upper frame assembly at two spaced apart points.

14. The ladder stand of claim 12, further comprising a limit bar which is fixedly attached to the brace of the upper frame assembly, to limit downward movement of the seal.

15. The ladder stand of claim 12, wherein the standing platform includes a first end which is operatively attached to the ladder, and a second end which is operatively connected to the upper frame assembly.

16. The ladder stand of claim 12, wherein the standing platform is substantially parallel to the brace in the installed configuration thereof, and wherein the second end of the standing platform is suspended from the upper frame assembly by a plurality of support members extending therebetween.

17. The ladder stand of claim 12, further comprising at least one extension arm adjustably connected to said brace, for adjusting a position of said implement rest.

18. The ladder stand of claim 17, wherein the seat includes side portions which rest on and contact the pair of parallel legs of the brace when the seat is in the operative position thereof.

19. The ladder stand of claim 12, wherein said upper frame assembly includes a pivotally adjustable swing arm, said swing arm situated above the brace in the installed configuration of the ladder stand, and wherein said implement rest is attached to said swing arm.

20. A ladder stand for use in elevating a hunter or naturalist, said ladder stand comprising:

a ladder for enabling travel from the ground to a platform, an upper frame assembly comprising:

two spaced-apart reinforcing rails operatively attached to an upper end of the ladder, and a substantially U-shaped brace having a pair of parallel legs interconnected by a connecting member, wherein said brace rests on and is fixedly attached to the reinforcing rails, said brace having a closed end and an open end;

a standing platform for supporting a hunter or naturalist thereon, said standing platform being attached to the ladder so as to be substantially parallel to said brace in an installed configuration of said ladder stand;

a movable seat which is pivotally connected to the connecting member at the closed end of the U-shaped brace in a manner such that the seat is upwardly pivotally movable out of contact with the pair of parallel legs in the installed configuration of the ladder stand, and a plurality of securing members for removably attaching the ladder stand to a vertical support.

* * * * *

UNITED STATES PATENT AND TRADEMARK OFFICE
CERTIFICATE OF CORRECTION

| | |
|---|---|
| PATENT NO. | : 7,021,423 B1 |
| APPLICATION NO. | : 10/603754 |
| DATED | : April 4, 2006 |
| INVENTOR(S) | : Pestrue et al. |

It is certified that error appears in the above-identified patent and that said Letters Patent is hereby corrected as shown below:

<u>Column 3</u>:
  Line 61, change "components the" to --components of the--.

<u>Column 5</u>:
  Line 59, change "interconnected be a" to --interconnected by a--.

<u>Column 8</u>:
  Line 53, change "side portion which" to --side portions which--.

<u>Column 9</u>:
  Line 25, change "movement of the seal" to --movement of the seat--.

Signed and Sealed this

Twenty-second Day of August, 2006

JON W. DUDAS
*Director of the United States Patent and Trademark Office*